US010122236B2

(12) United States Patent
Song et al.

(10) Patent No.: US 10,122,236 B2
(45) Date of Patent: Nov. 6, 2018

(54) METHODS AND APPARATUS FOR MOUNTING A MOTOR CONTROLLER ON A STATOR ASSEMBLY

(71) Applicant: Regal Beloit America, Inc., Beloit, WI (US)

(72) Inventors: Wei Song, Fort Wayne, IN (US); David M. Pierre, Fort Wayne, IN (US); Kamron Wright, Fort Wayne, IN (US); Paul Nathanael Selking, Ossian, IN (US); Donn Edward Steffen, Paulding, OH (US)

(73) Assignee: Regal Beloit America, Inc., Beloit, WI (US)

( * ) Notice: Subject to any disclaimer, the term of this patent is extended or adjusted under 35 U.S.C. 154(b) by 319 days.

(21) Appl. No.: 14/553,356

(22) Filed: Nov. 25, 2014

(65) Prior Publication Data

US 2015/0076941 A1 Mar. 19, 2015

Related U.S. Application Data

(63) Continuation of application No. 13/285,389, filed on Oct. 31, 2011, now Pat. No. 8,896,169.

(51) Int. Cl.
*H02K 5/22* (2006.01)
*H02K 5/04* (2006.01)
(Continued)

(52) U.S. Cl.
CPC ............... *H02K 5/225* (2013.01); *H02K 5/00* (2013.01); *H02K 5/20* (2013.01); *H02K 11/33* (2016.01);
(Continued)

(58) Field of Classification Search
CPC .......... H02K 11/03; H02K 3/522; H02K 5/20; H02K 2203/03; H02K 5/00; H02K 5/04; H02K 5/15; H02K 5/18; H02K 5/22
(Continued)

(56) References Cited

U.S. PATENT DOCUMENTS 3,495,109 A 2/1970 Ames
4,668,898 A * 5/1987 Harms .................. H02K 11/33 310/227
(Continued)

FOREIGN PATENT DOCUMENTS

CN 1820401 A 8/2006
CN 101268228 A 9/2008
(Continued)

OTHER PUBLICATIONS

CN Application No. 201210426249.X, RBC Manufacturing Corporation, mailed Dec. 5, 2016, 11 pages.
(Continued)

*Primary Examiner* — Burton Mullins
(74) *Attorney, Agent, or Firm* — Armstrong Teasdale LLP

(57) ABSTRACT

An electric machine includes a motor having a motor chassis having a first and second end, a stator assembly, and a rotor assembly. The electric machine includes a motor control assembly having a circuit board. The motor control assembly is attached to the stator assembly of the motor. A first end shield is attached to the first end of the motor chassis. The first end shield includes a first opening that is configured to enable a cooling air stream to pass therethrough to cool the motor and the motor control assembly.

18 Claims, 4 Drawing Sheets

200 202 210 218 220 230 270 260 216 290 246 248 250 295 212 214 280 240 244 242

(51) Int. Cl.
*H02K 5/00* (2006.01)
*H02K 5/20* (2006.01)
*H02K 15/02* (2006.01)
*H02K 11/33* (2016.01)
*H02K 3/52* (2006.01)

(52) U.S. Cl.
CPC ............. *H02K 15/02* (2013.01); *H02K 3/522* (2013.01); *H02K 5/04* (2013.01); *H02K 5/22* (2013.01); *Y10T 29/49009* (2015.01); *Y10T 29/49012* (2015.01)

(58) Field of Classification Search
USPC ......................... 310/67 D, 68 R, 71, 89, 194
See application file for complete search history.

(56) References Cited

U.S. PATENT DOCUMENTS 5,006,744 A * 4/1991 Archer .................. H02K 11/33 310/58
5,200,661 A * 4/1993 Shramo .................... H02K 3/04 310/156.06
5,220,226 A 6/1993 Long et al.
5,245,237 A * 9/1993 Fisher .................... H02K 5/225 310/89
5,287,028 A 2/1994 Suzuki et al.
5,895,994 A * 4/1999 Molnar .................. H02K 1/165 310/194
5,939,807 A * 8/1999 Patyk ..................... H02K 5/161 310/64
6,211,587 B1 4/2001 Enomoto et al.
6,274,957 B1 * 8/2001 Mahn ....................... H02K 3/38 29/596
7,180,215 B2 2/2007 Archer et al.
7,215,052 B2 5/2007 Blase et al.
7,242,125 B2 * 7/2007 Schneider .............. H02K 3/345 310/194
7,256,522 B2 8/2007 Johnson et al.
7,291,955 B2 * 11/2007 Otsuji .................... H02K 3/522 310/194
7,352,095 B2 4/2008 Archer et al.
7,358,634 B2 4/2008 Archer et al.
7,420,302 B2 9/2008 Archer et al.
7,498,702 B2 3/2009 Migita et al.
7,791,234 B2 * 9/2010 Nolley ..................... H02K 5/15 310/89
2006/0267431 A1 * 11/2006 Johnson ............... H02K 5/1732 310/89
2006/0267432 A1 * 11/2006 Archer ..................... H02K 5/04 310/89
2007/0063603 A1 3/2007 Levine et al.
2009/0140585 A1 6/2009 Pant
2011/0057524 A1 3/2011 Andrieux et al.

FOREIGN PATENT DOCUMENTS

CN 201533207 U 7/2010
DE 20004905 U1 * 6/2000 ............... H02K 5/18

OTHER PUBLICATIONS

Office Action for CN 201210426249.X for RBC Manufacturing Corporation dated Mar. 17, 2016, 11 pages.

* cited by examiner 62
16
14
30
12
28
13
19
16
30
11
61
32
34
17
61
61
15
20
63
18
63
27
63
40
46
41
63
24
65
65
56
44
49
52
78
65
65
42
58
67
58
67
58
67
58
67
60
26
60
23
22
60
60
25

METHODS AND APPARATUS FOR MOUNTING A MOTOR CONTROLLER ON A STATOR ASSEMBLY

CROSS-REFERENCE TO RELATED APPLICATIONS

This application is a Continuation of U.S. patent application Ser. No. 13/285,389 filed Oct. 31, 2011, issued as U.S. Pat. No. 8,896,169, the entire content of which is incorporated herein by reference.

BACKGROUND OF THE INVENTION

The field of the disclosure relates generally to electric machines, and more specifically, to methods and apparatus for mounting a motor controller on a stator assembly.

As described herein, at least one existing motor control assembly is situated in an aluminum housing which is subsequently attached to a motor chassis, adjacent an end shield. In another described motor, a "mid-shield" is installed into the motor chassis, which supports the motor bearing, and allows for the components of the motor control assembly to extend into the motor chassis, eliminating one end shield from such motor assemblies.

Solid end shields obstruct airflow. As a consequence of using a solid end shield, electronics in the motor control assembly do not get adequately cooled. In addition, the windings of the motor are not adequately cooled when an end shield is incorporated between the windings and the motor controller. Reliability and efficiency of the motor may suffer.

Other attempts at mounting a control assembly on stator assemblies have been made. In one process, posts are molded around the perimeter of a plastic stator end-cap and corresponding mating holes are created in the circuit board of the motor control assembly to fit with these posts. After the circuit board is seated, the protruding ends of the posts that extend beyond the board are melted down to hold the board in place. Such a process is slow, prone to human error, and impractical for rework.

In another configuration, snap-in fingers are formed around the plastic stator end-cap. These flexible fingers allow the circuit board of the motor control assembly to snap in and hold it in place. The snap-in fingers are part of the end-cap structure and one drawback to such a configuration is that the protruding fingers tend to interfere with the stator winding process, and the snap-in fingers may break off from handling in the manufacturing process.

BRIEF DESCRIPTION OF THE INVENTION

In one aspect, an electric machine is provided. The electric machine includes a motor having a motor chassis including a first end and a second end, a stator assembly, and a rotor assembly. The electric machine includes a motor control assembly having a circuit board. The motor control assembly is coupled to the stator assembly. In addition, the electric machine includes a first end shield coupled to the first end of the motor chassis. The first end shield includes a first opening that is configured to facilitate a cooling air stream to pass therethrough to cool the motor and the motor control assembly.

In another aspect, a method for fabricating an electric machine is provided. The method includes attaching a circuit board of a motor control assembly to a first side of a mounting adapter, and attaching a second side of the mounting adapter to a stator assembly. The method also includes attaching a first end shield including a first opening to a motor chassis of the electric machine. The first opening is configured to facilitate a cooling air stream to pass therethrough to cool the electric machine and the motor control assembly.

The features, functions, and advantages that have been discussed can be achieved independently in various embodiments or may be combined in yet other embodiments further details of which can be seen with reference to the following description and drawings.

DETAILED DESCRIPTION OF THE INVENTION

The methods, systems, and apparatus described herein facilitate efficient and economical manufacturing of an electric machine. Although described herein as associated with an electric motor, the methods, systems, and apparatus described herein may also be associated with an electric generator.

Embodiments are directed to an adapter for mounting a motor controller on a stator assembly offering features for manufacturing application and service.

Figure 1:
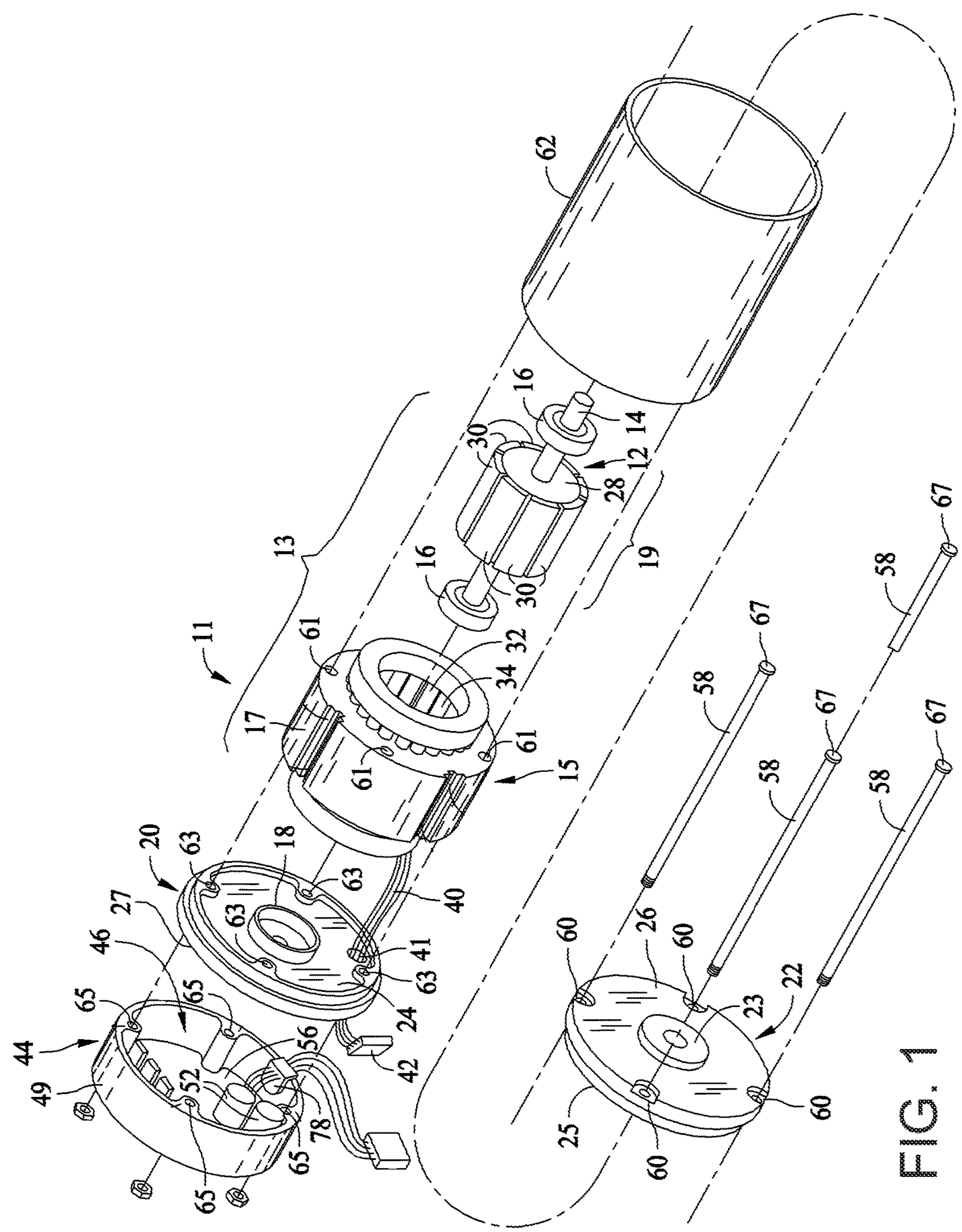
FIG. 1 is an exploded view of an integrated electronically commutated motor (ECM) and control circuit assembly.

Referring to the drawings, and more particularly to FIG. 1, reference character 11 generally designates one known integrated electronically commutated motor and control circuit assembly. Motor assembly 11 includes a brushless electronically commutated DC motor 13 having a stationary assembly 15 including a stator core 17 and a rotatable assembly 19 including a permanent magnet rotor 12 and a shaft 14. A fan (not shown) or other means to be driven such as means for moving air through an air handling system engages the shaft 14.

Rotor 12 is mounted on and keyed to the shaft 14 journaled for rotation in conventional bearings 16. The bearings 16 are mounted in bearing supports 18 integral with a first end member 20 and a second end member 22. The end members 20 and 22 are substantially flat and parallel to each other and may be referred to as end shields. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. In the illustrated embodiment, eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. Alternatively, arcs with multiple north-south pairs may be utilized. Motor having interior permanent magnets, for example, mounted within the core 28 are also known.

Stationary assembly 15 comprises a plurality of winding stages 32 adapted to be electrically energized to generate an electromagnetic field. Stages 32 are coils of wire wound around teeth 34 of the laminated stator core 17. The winding end turns extend beyond the stator end faces and winding terminal leads 40 are brought out through an aperture 41 in the first end member 20 terminating in a connector 42. While stationary assembly 15 is illustrated for purposes of disclosure, other stationary assemblies of various other constructions having different shapes and with different number of teeth are known.

Motor assembly 11 further includes a cap 44 which is mounted on the rear portion of the motor assembly 11 to enclose within the cap 44 control means 46 for the motor 13. The cap 44 and the control means may sometimes be referred to collectively as a motor control assembly. Cap 44 includes a substantially annular side wall 49. When assembly is completed, the control means 46 are positioned adjacent the outer side 27 of the first end member 20. The control means 46 includes a plurality of electronic components 52 and a connector (not shown) mounted on a component board 56, such as a printed circuit board. The control means 46 is connected to the winding stages 32 by interconnecting connector 42 and connector (not shown). The control means 46 applies a voltage to one or more of the winding stages 32 at a time for commutating the winding stages 32 in a preselected sequence to rotate the rotatable assembly 19 about an axis of rotation.

As mentioned herein, the engagement between the first end member and the cap 44, which is sometimes referred to as a housing, substantially forms a chamber for electronic components 52 and component board 56 which does not allow for any air flow across the components 52.

To effect this engagement, connecting elements 58 comprising a plurality of bolts pass through bolt holes 60 in the second end member 22, bolt holes 61 in core 17, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 15, and the rotatable assembly 19 therebetween. Additionally, a housing, or chassis, 62 may be positioned between the first end member 20 and the second end member 22 for enclosing and protecting the stationary assembly 15 and the rotatable assembly 19.

Figure 2:
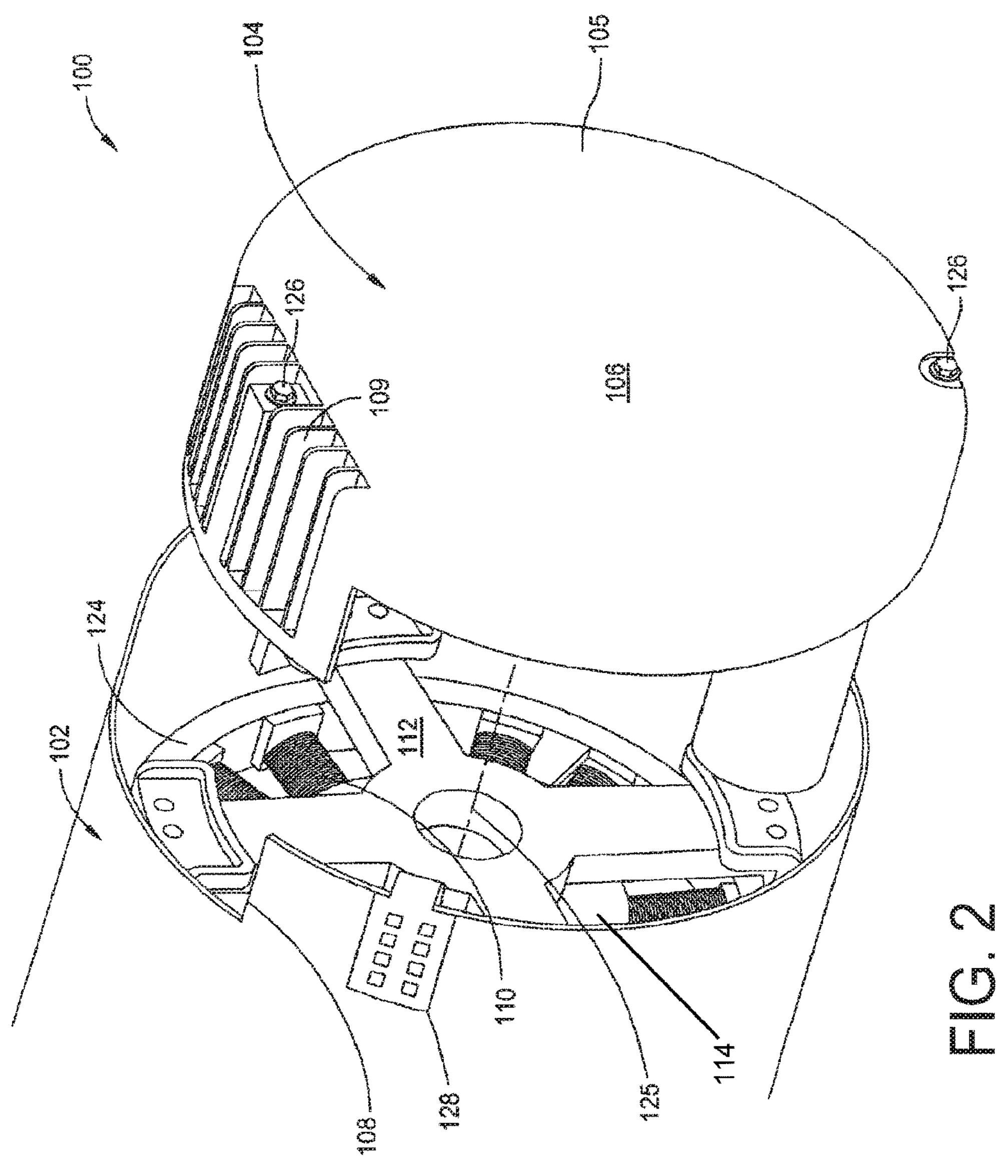
FIG. 2 is an exploded partial view of an ECM that includes a mid shield which allows a control circuit to fit into the main chassis of the ECM.

Attempts have been made to address the airflow issues noted above, and to reduce the number and/or weight of components associated with such motors. For example, FIG. 2 is an exploded end view of an embodiment of another known motor 100. Motor 100 includes a motor enclosure 102 and a motor control unit 104 configured for attachment to motor enclosure 102. A chassis 105 of motor control unit 104 serves as an end shield 106 for motor 100. Motor enclosure 102 also includes a slot 108 which engages a heat sink 109 formed in chassis 105 as further described below. While motor control unit 104 includes chassis 105, motor 100 is configured such that motor enclosure 102 provides substantially all of the enclosure for motor control unit 104. Within motor enclosure 102 are windings 110 of motor 100 and a mid-shield 112 configured for placement between windings 110 and motor control unit 104.

The placement and configuration of mid-shield 112 allows motor control unit 104 of motor 100 to be removed and replaced without disruption or displacement of a motor winding assembly 124 which includes windings 110 of motor 100. As illustrated, motor enclosure 102 is configured to form a part of the enclosure for motor control unit 104, along with end shield 106, allowing for a one-piece enclosure configuration. Mid-shield 112 is also configured to meet any airflow, voltage clearances, and assembly height limitations imposed on motor 100.

In one embodiment, as illustrated, mid-shield 112 fits precisely with respect to a centerline 125 of motor 100 and further aligns with two bolts 126 that pass through end shield 106 of motor control unit 104 to clamp and secure mid-shield 112 and motor control unit 104 within motor enclosure 102. Mid-shield 112 also contributes to a lower material cost for motor 100, because with mid-shield 112, motor enclosure 102 is utilized as a part of the containment enclosure for portions of motor control unit 104 as shown in FIG. 2, decreasing the size and number of components of motor 100 as compared to motor 11 (shown in FIG. 1). Additionally, such a configuration allows for a placement of a power connector 128 that is flush with chassis 102.

Utilization of mid-shield 112 allows motor control unit 104 to be removed from enclosure 102 without disturbing the rest of the motor assembly, for example, windings 110. The non-disturbance is obtained by using mid-shield 112 to secure a bearing that engages a motor shaft (neither shown in FIG. 1) of motor 100. Therefore, enclosure 102 is additionally configured to provide any required clearances for the electrical components (e.g., motor control unit 104) of motor 100 to allow disengagement of motor control unit 104 from motor 100. In summary, motor 100 is an improvement over motor 11 in that there is no separate end member 20, and the configuration of the mid-shield 112 allows for airflow through one or more openings 114 that might be generated by motor operation to be of at least some use in cooling the electronic components that are mounted and housed within motor control unit 104.

Figure 3:
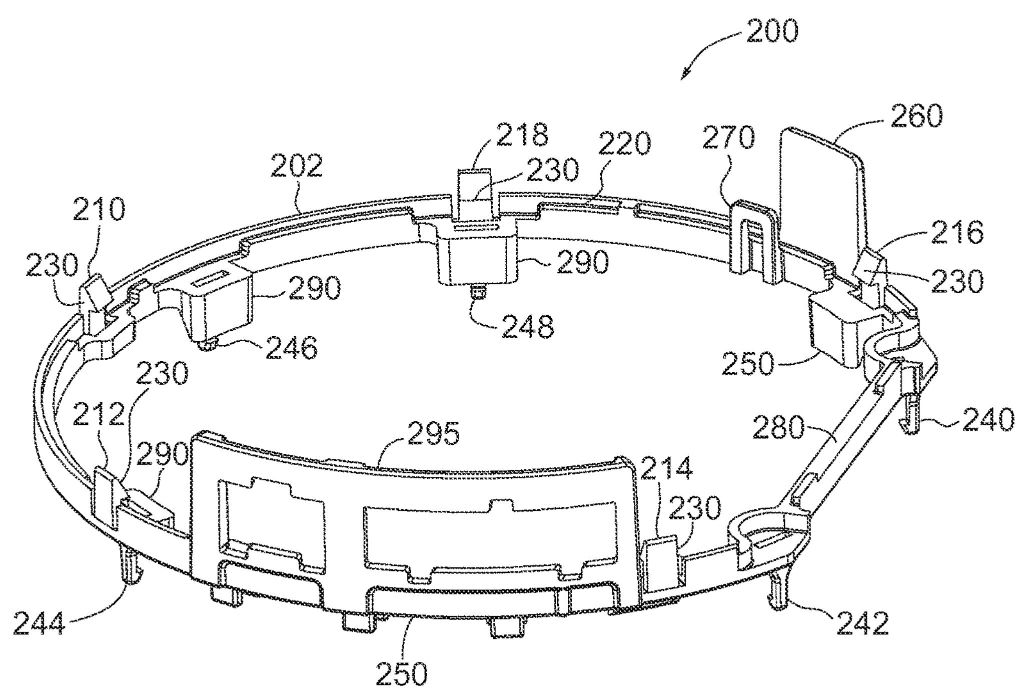
FIG. 3 is an illustration of an adapter that attaches a motor control assembly to a stator assembly.
Figure 4:
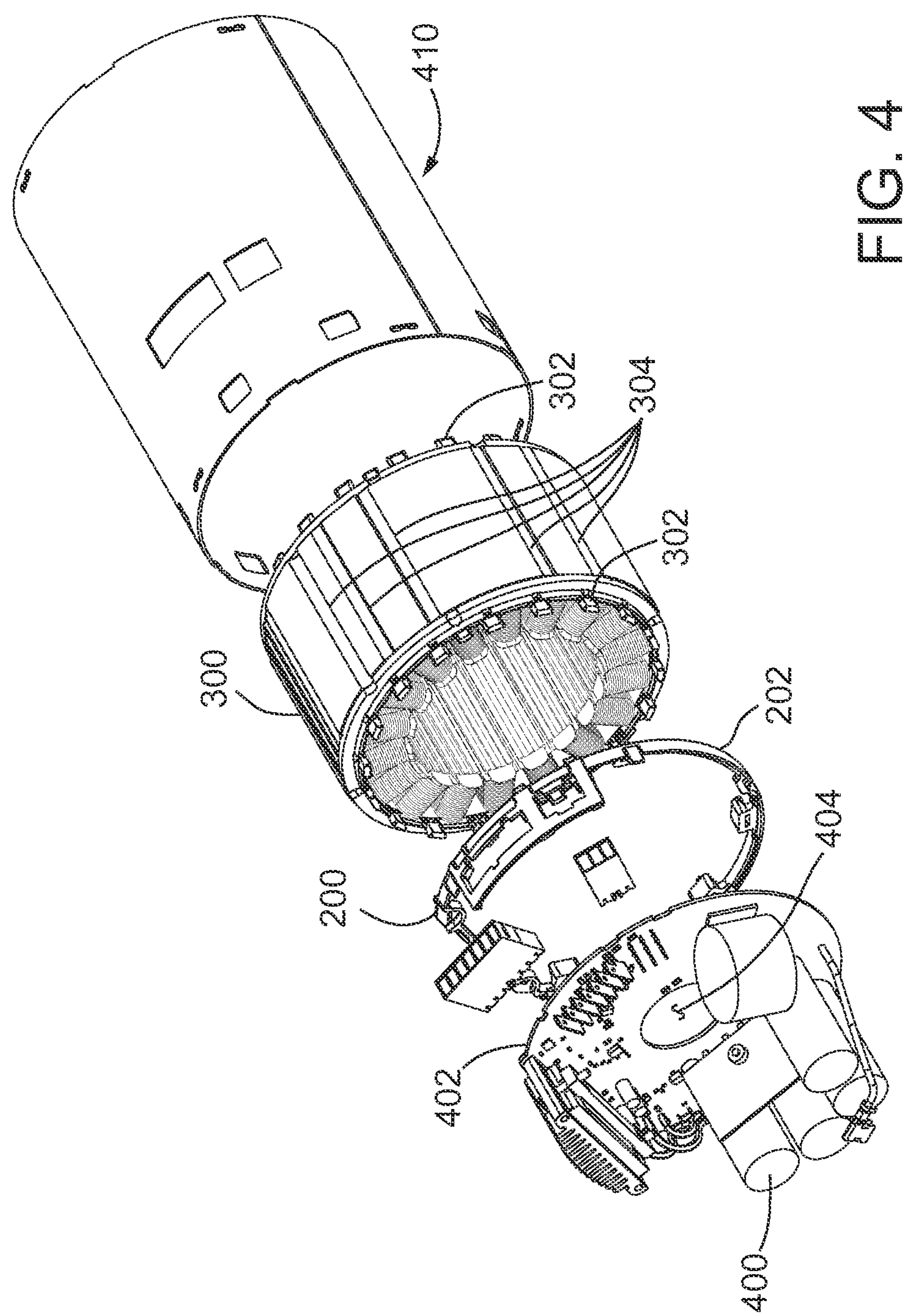
FIG. 4 is an exploded view of a motor that incorporates the adapter of FIG. 3.

FIG. 3 is an illustration of a motor control mounting adapter 200. As shown in FIG. 4, adapter 200 is configured to attach to a stator assembly 300 and engage a motor control assembly 400, specifically, a circuit board 402 of the motor control assembly 400. Once the adapter 200 attaches the motor control assembly 400 to the stator assembly 300 the combination may be inserted into a motor chassis 410. Alternatively, the stator assembly 300 may already be placed within chassis 410, and the adapter 200 is then inserted into the motor chassis 410 to engage the stator assembly 300.

Referring back to FIG. 3, the main architecture of the adapter 200 consists of a ring 202 which operates as a base for snap latches 210, 212, 214, 216, 218 about the perimeter of the ring 202. In use, a circuit board, such as circuit board 402, is pressed onto a top side 220 of the adapter 200. As the circuit board is pressed down, the snap latches 210, 212, 214, 216, 218 that extend from the top side 220 of ring 202 flex outward to allow the circuit board to be properly positioned with respect to the adapter 200. When the circuit board is seated, the snap latches 210, 212, 214, 216, 218 flex back, with the tangs 230 molded thereon operating to retain the circuit board in place. Similarly, stator engaging latches 240, 242, 244, 246, and 248 extending from a bottom side 250 of adapter 200 operate to engage corresponding openings 304 in a stator assembly 300 as can be discerned from FIG. 4.

The snap latches 210, 212, 214, 216, 218 on the top side 220 of the adapter ring 200 operate to secure a circuit board, and therefore the components mounted thereon, in place while providing a configuration that allows for relatively easy installation and removal of the motor control assembly 400.

The stator engaging latches 240, 242, 244, 246, and 248 that extend from the bottom side 250 of the ring 202 allow for latching of the ring 202, and therefore the motor control assembly 400, to stator assembly 300 thereby saving a stator end-cap 302 from having dedicated features for board mounting and bringing no impact to the existing manufacturing process. Instead, end-caps 302 may be configured as simple plastic insulators on each end of the stator assembly 300.

As discerned from FIGS. 3 and 4, placement of the snap latches 210, 212, 214, 216, 218, and the stator engaging latches 240, 242, 244, 246, and 248 configure the adapter ring 200 with polarizing and keying features to ensure correct mating between the various components. One embodiment of adapter 200 incorporates a wire barrier 260 and a tie wrap post 270 for tying and constraining magnet wires. Various embodiments of adapter 200 incorporate a mounting guide 280, which is a straightened area within the ring 202 as well as reinforcing structures 290 placed about the ring 202. A polarizing and keying structure 295 help an external connector to mate with the connector on the control assembly 400.

The adapter 200 described herein enables the motor control assembly 400 to be mounted on the stator assembly 300, acting as a bonding device between the motor control assembly 400 and the stator assembly 300 as seen in FIG. 4. On the top side 220 of the adapter 200, snap latches 210, 212, 214, 216, 218 are deployed to allow the circuit board 402 to be secured into the adapter 200. On the bottom side 250 of the adapter 200 stator engaging latches 240, 242, 244, 246, and 248 are deployed to hook the adapter 200 onto a stator assembly 300 or a stator end-cap 302 formed as a part of stator assembly 300.

With the motor control assembly 400 mounted on the stator assembly 300, a shaft of the motor may extend through a hole 404 formed in the circuit board 402 to an end shield, thus eliminating a mid-shield. In regard to thermal improvement, a solid end shield obstructs airflow. By mounting the motor control assembly 400 on the stator assembly 300 and creating openings in both end shields, an air stream blows from end to end through the motor as it runs. Both the electronic components and motor windings are cooled effectively.

The motor control assembly 400 can be pressed into the adapter 200 without over-stressing the snap latches 210, 212, 214, 216, 218 which operate to hold the motor control assembly 400 in a tight and secure manner. The adapter 200 and motor control assembly 400 combination can be pressed onto the stator end-cap 302 without over-stressing the stator engaging latches 240, 242, 244, 246, and 248. The stator engaging latches 240, 242, 244, 246, and 248 allow adapter 200 to retain the motor control assembly 400 in position with respect to the stator assembly 300 in a tight and secure manner.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:

a motor comprising:

a motor chassis comprising a first end shield and a second end shield;

a stator assembly; and a rotor assembly;

a motor control assembly comprising a circuit board, said motor control assembly coupled to said stator assembly; and a mounting adapter comprising a ring segment and a mounting guide, said ring segment comprising a first side and a second side, said first side configured for engagement with said circuit board, said second side configured for direct engagement with said stator assembly, said mounting adapter operable for maintaining a position of said circuit board with respect to said stator assembly, wherein said mounting guide is configured to align said mounting adapter with one or more of said stator assembly, said motor control assembly, and said motor chassis, said mounting guide comprises a straight chord segment that intersects said ring segment at two points.

2. The electric machine according to claim 1 wherein said mounting adapter comprises a plurality of flexible snap latches that extend from said first side of said mounting adapter, said plurality of flexible snap latches operable for retaining said circuit board in position with respect to said mounting adapter.

3. The electric machine according to claim 1, wherein said stator assembly comprises at least one insulating end-cap coupled thereto.

4. The electric machine according to claim 3 wherein said second side is coupled directly to said insulating end-cap of said stator assembly.

5. The electric machine according to claim 4, wherein said mounting adapter comprises a diameter slightly less than an inside perimeter of said motor chassis.

6. The electric machine according to claim 1 wherein said circuit board comprises a hole therethrough, said hole substantially centered with a longitudinal axis of said electric machine and operable for placing a shaft of said motor therethrough for engagement with said first end shield.

7. The electric machine according to claim 1 wherein said mounting adapter further comprises a wire barrier for constraining motor wiring.

8. The electric machine according to claim 1 wherein said mounting adapter further comprises a tie wrap post for tying motor wiring.

9. The electric machine according to claim 1 wherein said mounting adapter comprises a plurality of flexible stator engaging latches that extend from said second side of said mounting adapter, said plurality of flexible stator engaging latches operable for retaining said mounting adapter and said circuit board in position with respect to said stator assembly.

10. An electric machine comprising:

a motor comprising:

a motor chassis comprising a first end shield and a second end shield;

a stator assembly; and a rotor assembly;

a motor control assembly comprising a circuit board, said motor control assembly coupled to said stator assembly;

a mounting adapter comprising a ring segment and a mounting guide, said ring segment comprising a first side, a second side, and a plurality of flexible snap latches extending from said first side, said plurality of flexible snap latches operable for retaining said circuit board in position with respect to said mounting adapter, said second side configured for engagement with said stator assembly, said mounting adapter operable for maintaining a position of said circuit board with respect to said stator assembly, wherein said mounting guide is configured to align said mounting adapter with one or more of said stator assembly, said motor control assembly, and said motor chassis, said mounting guide comprises a straight chord segment that intersects said ring segment at two points; and a mid-shield coupled to said motor chassis and spaced axially from an end shield of said motor, said mid-shield comprising a first opening configured to facilitate a cooling air stream to pass therethrough to cool said motor and said motor control assembly.

11. An electric machine comprising:

a motor comprising:

a motor chassis comprising a first end shield and a second end shield;

a stator assembly; and a rotor assembly;

a motor control assembly comprising a circuit board, said motor control assembly coupled to said stator assembly; and a mounting adapter comprising a ring segment and a mounting guide, said ring segment comprising a first side, a second side, and a plurality of flexible snap latches extending from said first side, said plurality of flexible snap latches operable for retaining said circuit board in position with respect to said mounting adapter, said second side configured for engagement with said stator assembly, said mounting adapter operable for maintaining a position of said circuit board with respect to said stator assembly, said mounting adapter is ring shaped, wherein said mounting guide is configured to align said mounting adapter with one or more of said stator assembly, said motor control assembly, and said motor chassis, said mounting guide comprises a straight chord segment that intersects said ring segment at two points.

12. The electric machine according to claim 11 wherein said mounting adapter further comprises a wire barrier for constraining motor wiring.

13. The electric machine according to claim 11 wherein said mounting adapter further comprises a tie wrap post for tying motor wiring.

14. The electric machine according to claim 11, wherein said stator assembly comprises at least one insulating end-cap coupled thereto.

15. The electric machine according to claim 14 wherein said second side is coupled directly to said insulating end-cap of said stator assembly.

16. The electric machine according to claim 11, wherein said mounting adapter comprises a diameter less than an inside perimeter of said motor chassis.

17. The electric machine according to claim 11 wherein said circuit board comprises a hole therethrough, said hole substantially centered with a longitudinal axis of said electric machine and operable for placing a shaft of said motor therethrough for engagement with said first end shield.

18. The electric machine according to claim 11 wherein said mounting adapter comprises a plurality of flexible stator engaging latches that extend from said second side of said mounting adapter, said plurality of flexible stator engaging latches operable for retaining said mounting adapter and said circuit board in position with respect to said stator assembly.

* * * * *